United States Patent
Lambert et al.

(10) Patent No.: US 12,192,105 B2
(45) Date of Patent: Jan. 7, 2025

(54) METHOD FOR OPTIMIZING TRAFFIC BETWEEN AUTONOMOUS SYSTEMS

(71) Applicant: Orange, Issy-les-Moulineaux (FR)

(72) Inventors: Anthony Lambert, Chatillon (FR); Elkin Aguas, Chatillon (FR)

(73) Assignee: Orange, Issy-les-Moulineaux (FR)

( * ) Notice: Subject to any disclaimer, the term of this patent is extended or adjusted under 35 U.S.C. 154(b) by 39 days.

(21) Appl. No.: 17/657,717

(22) Filed: Apr. 1, 2022

(65) Prior Publication Data

US 2022/0321477 A1  Oct. 6, 2022

(30) Foreign Application Priority Data

Apr. 2, 2021 (FR) .................................... 2103458

(51) Int. Cl.
*H04L 47/122* (2022.01)
*H04L 47/125* (2022.01)
*H04L 47/2416* (2022.01)
*H04L 47/41* (2022.01)

(52) U.S. Cl.
CPC .......... *H04L 47/122* (2013.01); *H04L 47/125* (2013.01); *H04L 47/2416* (2013.01); *H04L 47/41* (2013.01)

(58) Field of Classification Search
CPC . H04L 47/122; H04L 47/125; H04L 47/2416; H04L 47/41
See application file for complete search history.

(56) References Cited

U.S. PATENT DOCUMENTS

| | | | | |
|---|---|---|---|---|
| 2012/0224506 A1* | 9/2012 | Gredler | ................. | H04L 45/124 370/254 |
| 2014/0036663 A1* | 2/2014 | Narayanan | .............. | H04L 45/04 370/230 |
| 2018/0234348 A1* | 8/2018 | Goloubew | ............ | H04L 41/147 |
| 2020/0007399 A1* | 1/2020 | Barth | ................... | H04L 41/0896 |
| 2020/0007435 A1* | 1/2020 | Paida | ...................... | H04L 47/22 |
| 2021/0099378 A1* | 4/2021 | Alaettinoglu | ........... | H04L 41/16 |

OTHER PUBLICATIONS

Jose M. Camacho et al., "BGP-XM: BGP extended Multipath for transit Autonomous Systems", Computer Networks, vol. 57, No. 4, Mar. 31, 2013, pp. 954-975.
French Search Report for French Application No. FR2103458 dated Dec. 23, 2021.

* cited by examiner

*Primary Examiner* — Thu V Nguyen
*Assistant Examiner* — Ranjan Pant
(74) *Attorney, Agent, or Firm* — Knobbe, Martens, Olson & Bear, LLP (57) ABSTRACT

A method of distributing traffic across a set of links interconnecting a local autonomous system with autonomous systems neighboring the local autonomous system is disclosed. The method comprises /a/ receiving information relating to characteristics of the neighboring autonomous systems; /b/ determining a result of a reward function, representative of a state of the set of links; /c/ triggering, based on the information received and the result of the reward function, at least one action influencing a distribution of traffic across the set of links so as to optimize the load state of the set of links; /d/ reiterating steps /a/ to /c/; the at least one action being identified by an artificial intelligence configured to learn to identify, on the basis of successive results of the reward function, actions enabling traffic to be distributed across the set of links to optimize the load state of the set of links.

8 Claims, 4 Drawing Sheets

METHOD FOR OPTIMIZING TRAFFIC BETWEEN AUTONOMOUS SYSTEMS

CROSS-REFERENCE TO RELATED APPLICATIONS

This application claims foreign priority to French Patent Application No. 2103458, filed Apr. 2, 2021, the content of which is incorporated by reference herein in its entirety.

BACKGROUND

Field

The present disclosure relates to the field of traffic between autonomous systems.

More specifically, the present disclosure relates to a method for distributing traffic across a set of links interconnecting a plurality of autonomous systems.

Description of the Related Art

The Internet is composed of autonomous systems, sets of networks and routers under a single administrative authority.

To maintain the global accessibility and connectivity of the Internet, the autonomous systems must be interconnected and exchange information relating to networks under the responsibility of different operators, enabling the autonomous systems to send traffic in the form of data packets.

The interconnection between different autonomous systems is not achieved by chance and is often based on bilateral agreements between operators. In the event of a plurality of possible paths to a same destination, the selection of the path that the traffic will take results from sequentially examining the preferences of the autonomous systems through which the traffic passes, as well as the preferences of neighboring autonomous systems. The paths are constructed as a sum of local decisions, and each autonomous system will choose, locally and independently from other autonomous systems, a better path to a given destination The challenge for an autonomous system is to announce the prefixes of the networks under its responsibility in the Internet in a manner that has the potential to influence in its favor the best paths created by other autonomous systems.

It therefore may be difficult to anticipate the path that traffic will take, and to ensure good load distribution on the links that transport traffic from one autonomous system to another.

The consequence is that certain links may be overloaded and saturated, leading to a loss of the content transmitted, while other links may have a light load, or no load at all. In addition, the distribution of traffic across the links may not satisfy any agreements if there are such.

An autonomous system that observes such suboptimality in the traffic distribution may implement various optimization actions, particularly actions modifying the BGP (Border Gateway Protocol) attributes to which it has access, or actions modifying the announcement of prefixes of networks under its responsibility.

Manual implementation of such optimization actions is complex and may lead to errors. It proceeds in steps, each step comprising the application of an optimization action and the subsequent observation of the action's effect on the load state of the links.

Automatization may aid this implementation of actions. However, automatization is based on predefined rules for choosing the actions to execute, which may lead to the execution of inappropriate or unnecessary actions, and may even cause oscillations between two or more suboptimal states of the link load state.

SUMMARY

The present disclosure aims to improve the situation.

A method is proposed for distributing traffic across a set of links interconnecting a local autonomous system with a plurality of autonomous systems neighboring the local autonomous system, the method comprising: /a/ receiving information at least relating to characteristics of the plurality of neighboring autonomous systems; /b/ determining, from the information received, a result of a reward function, representative of a state of said set of links; /c/ triggering, based on the information received and the result of the reward function, at least one action influencing a distribution of traffic across the set of links so as to optimize the load state of the set of links; /d/ reiterating steps /a/ to /c/; the at least one action being identified by an artificial intelligence configured to learn to identify, on the basis of successive results of the reward function, actions enabling traffic to be distributed across the set of links so as to optimize the load state of the set of links.

An autonomous system may be a set of networks and routers under a single administrative authority. Different autonomous systems can be interconnected by links for transporting traffic, and BGP (Border Gateway Protocol) routers implementing a BGP protocol, with the objective of exchanging routing and accessibility information of computer networks under the responsibility of the autonomous systems.

In one embodiment, the information received during step /a/ is representative of: a load state of the set of links; a type of autonomous system for each of the neighboring autonomous systems; prefixes relating to networks hosted by the local autonomous system and by the neighboring autonomous systems, the prefixes being announced by an autonomous system to its neighbors. A prefix may be an identifier enabling each network within an autonomous system to be identified.

A local autonomous system may be an autonomous system connected to one or more other autonomous systems, and which implements the method.

A neighboring autonomous system may be an autonomous system to which a local autonomous system is directly connected; i.e., without having to go through another autonomous system.

Traffic transmitted between autonomous systems can correspond to any type of data transmitted from one autonomous system to another.

The method, implemented by a device in, or associated with, the local autonomous system, aims to influence the distribution of traffic into the local autonomous system, i.e., traffic entering the local autonomous system.

A load state of a link may correspond to the type and/or volume of traffic transported on the link.

A type of autonomous system may characterize a hierarchic level of one autonomous system in relation to another autonomous system. Such a type of autonomous system may be, for example, a client autonomous system, a peer autonomous system or a provider autonomous system.

A client autonomous system may be an autonomous system that obtains data and/or that uses services provided by another autonomous system. A client autonomous system is often an individual or small business.

A provider autonomous system may be an autonomous system that implements an infrastructure to offer services to other autonomous systems and/or to provide data to other autonomous systems. A provider autonomous system may enable a client autonomous system to access the networks under its responsibility. A provider autonomous system may be, for example, an Internet access provider, a technology company, a university or a governmental agency.

Peer autonomous systems may be autonomous systems of the same hierarchic level which conclude agreements relating to a joint implementation or use of structures such as networks or links to route traffic. In a peer type of interconnection, two autonomous systems may be mutually authorized to access a subset of networks under their responsibility. Peer autonomous systems may be, for example, Internet access providers.

A reward function is a concept in artificial intelligence. The result of the reward function is used to quantify the load distribution across the set of links, and to indicate if a load state is satisfactory or not.

In addition to the reward function, other elements from the information received may be taken into consideration to determine if a load state is satisfactory or not, for example, information that indicates traffic congestion on a given link.

The proposed method aims to respond to the disadvantages cited above and to propose an implementation of traffic optimization between a local autonomous system and the autonomous systems neighboring the local autonomous system, enabling better use of links and better traffic transmission quality.

The proposed method is innovative in terms of the determination of a reward function result, and in terms of the at least one action triggered, based on the information received and the reward function result, which makes it possible to distribute traffic across the set of links such that the load state of the set of links is optimized.

Moreover, the proposed method is novel in that the at least one action is identified by artificial intelligence configured to learn to identify the at least one action which makes it possible to distribute traffic across the set of links such that the load state of the set of links is optimized.

In the implementation of the method, no prior knowledge of the system state is required. The artificial intelligence can adapt to new situations and find solutions to complex problems. The artificial intelligence progressively discovers, on the basis of the reward function result, the at least one action that leads to optimization of the traffic and of the load state of the set of links. Learning enables the artificial intelligence to be trained, after one or more iterations of the method, and to learn the impact of the at least one action triggered by it on the load state of the set of links, which enables it to choose the at least one action so as to optimize the load state of the set of links represented by the reward function result.

Traffic distribution has the effect of better balancing the loads across the set of links interconnecting the local autonomous system with its neighbors, improving the management and use of the links, as well as the traffic transmission quality.

The characteristics specified in the following paragraphs may, optionally, be implemented. The characteristics may be implemented independently from each other or in combination with each other.

In one embodiment, the artificial intelligence comprises a neural network.

A neural network is specially adapted to implement experiential learning, known as "machine learning."

Said learning allows optimizing the results obtained relating to the load state of the links to be optimized according to the actions triggered and the results obtained previously.

In one embodiment, optimization of the load state according to step /c/ comprises the convergence of the load state towards a desired load state.

The desired load state may be a predefined state or a state considered by the artificial intelligence to be advantageous, for example because it corresponds to an optimal reward function result.

It is often not possible to reach a desired load state by triggering one or more action(s) only once. Reiterating the method enables the artificial intelligence, in each iteration, to learn from prior actions, and therefore to trigger one or more optimized actions and to progressively converge towards the desired state. The artificial intelligence can thus learn, in an iterative process, the relationship between the triggered actions and the impact of the actions on the load state, for a given load state.

In one embodiment, the type of autonomous system may be a client autonomous system, a peer autonomous system or a provider autonomous system.

This information relating to the type of autonomous system for each of the respective neighboring autonomous systems may influence the result of the reward function, and therefore the at least one triggered action.

For example, a provider autonomous system having several possible paths for sending traffic may find it advantageous to pass through client autonomous systems, instead of passing through other provider autonomous systems.

In one embodiment, the at least one action triggered according to step /c/ comprises the modification of at least one BGP attribute.

BGP routers may select the best path to route traffic on the basis of the preferences and properties of the autonomous systems, links and BGP routers.

Modification of a BGP attribute represents a means of influencing the routing of traffic. Modification of one or more BGP attributes enables a local autonomous system to influence the manner in which the network prefixes are announced and the path the traffic will take, leading to a (potentially optimized) distribution of traffic across the links.

In one embodiment, the modification of the at least one BGP attribute comprises at least the modification of a BGP attribute among: MED, AS PATH, PREFIX.

The PREFIX attribute represents prefixes announced by the local autonomous system. The PREFIX may be modified by an action known as LOAD SHARING. Modification of the PREFIX by LOAD SHARING enables announcing only part of the prefixes and/or announcing prefixes to only a subset of the neighboring autonomous systems. The consequence may be that certain links will be preferred by the traffic and used on a priority basis to route the traffic. For example, if certain prefixes are announced to only some of the neighboring autonomous systems, it is probable that the traffic to these prefixes will be reduced and that the corresponding links will be less loaded.

The AS PATH attribute represents the sequence of autonomous systems through which the routing information has transited. In general, traffic will prefer the path for which the AS PATH attribute has the lowest number of autonomous systems. Modification of the AS PATH by an action known as PREPENDING enables a local autonomous system to increase the size of the AS PATH attribute artificially, in particular by prepending its own number several times. The traffic will prefer a path with a short AS PATH over a path with a long AS PATH.

For example, a local autonomous system may artificially increase the size of an AS PATH attribute such as "1 2 3", representative of a certain path that the traffic may take, by prepending its own number (e.g. "1 2 2 2 3") several times. If an alternative path that passes through another autonomous system (e.g. "1 4 3") exists, and appears to be shorter because the size of its AS PATH attribute has not been artificially increased, this path will be preferred over the path for which the AS PATH attribute has been increased ("1 2 2 2 3").

The MED (Multi Exit Discriminator) attribute may be exchanged between neighboring autonomous systems and indicates the preferred entry point of the local autonomous system for traffic coming from neighboring autonomous systems and going to the local autonomous system.

Modification of the MED attribute enables the entry point of the traffic from neighboring autonomous systems to be influenced in a local autonomous system. In general, traffic will prefer the path with a low MED value over a path with a high MED value.

Controlling one or more of these three attributes makes it possible to influence the distribution of traffic across the links so as to optimize the load state.

In one embodiment, modification of the at least one BGP attribute takes into consideration a propagation delay of the prefixes to be announced.

In general, modification of a BGP attribute does not cause an instantaneous modification in traffic distribution. A certain amount of time may be required for the corresponding information to propagate and produce its effects.

Consideration of a prefix propagation delay enables the artificial intelligence to determine the at least one triggered action.

In one embodiment, the method comprises a step of triggering at least one action randomly influencing a distribution of traffic across at least part of the set of links.

If the reward function result reaches a value considered to be optimal, the artificial intelligence may consider an optimal state to have been reached, although this may be a local extremum of the reward function. The load state may be trapped in a loop and oscillate between two or more suboptimal states. Such edge effects may be difficult to catch.

The triggering of at least one action randomly influencing a distribution of traffic, even though this distribution is not considered useful in principle, can help the load state exit such a suboptimal state.

Another aspect of the disclosure comprises a decision-making device for distributing traffic across a set of links interconnecting a local autonomous system with a plurality of autonomous systems neighboring the local autonomous system, the device comprising:
  at least one interface configured for:
    /a/ receiving information at least relating to characteristics of the plurality of neighboring autonomous systems (AS100, AS200, AS300)
  at least one processing circuit configured for:
    /b/ determining, from the information received, a result of a reward function, representative of a state of said set of links;
    /c/ triggering, based on the information received and the result of the reward function, at least one action influencing a distribution of traffic across the set of links so as to optimize the load state of the set of links /d/ reiterating steps /a/ to /c/;
  the device comprising an artificial intelligence configured to learn to identify, on the basis of successive results of the reward function, the at least one action enabling traffic to be distributed across the set of links so as to optimize the load state of the set of links.

The decision-making device may be integrated into, or associated with, the local autonomous system, and adapted for implementing the method described above in all its embodiments.

The proposed device is innovative in terms of the at least one action influencing the distribution of traffic that it can trigger, and in terms of the determination of a result of a reward function.

Moreover, the proposed device is novel in that it comprises an artificial intelligence configured to learn to identify the at least one action that enables traffic across the set of links to be distributed so as to optimize the load state of the set of links.

Another aspect of the present development comprises a computer program product comprising instructions for implementing the method of the present development, when this program is executed by a processor.

This program may use any programming language (for example, an object-oriented language or other), and be in the form of an interpretable source code, a partially compiled code or a completely compiled code.

Figure 2:
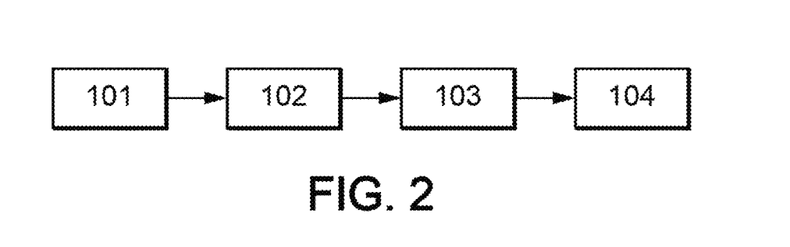
FIG. 2 shows a flow chart of a method for distributing traffic across a set of links interconnecting a local autonomous system with a plurality of autonomous systems neighboring the local autonomous system.

FIG. 2 described in detail below may constitute the flow chart of the general algorithm of such a computer program.

BRIEF DESCRIPTION OF THE DRAWINGS

Other characteristics, details and advantages of the development will appear upon reading the detailed description below, and analyzing the attached drawings, in which.

DETAILED DESCRIPTION OF CERTAIN EMBODIMENTS

Figure 1:
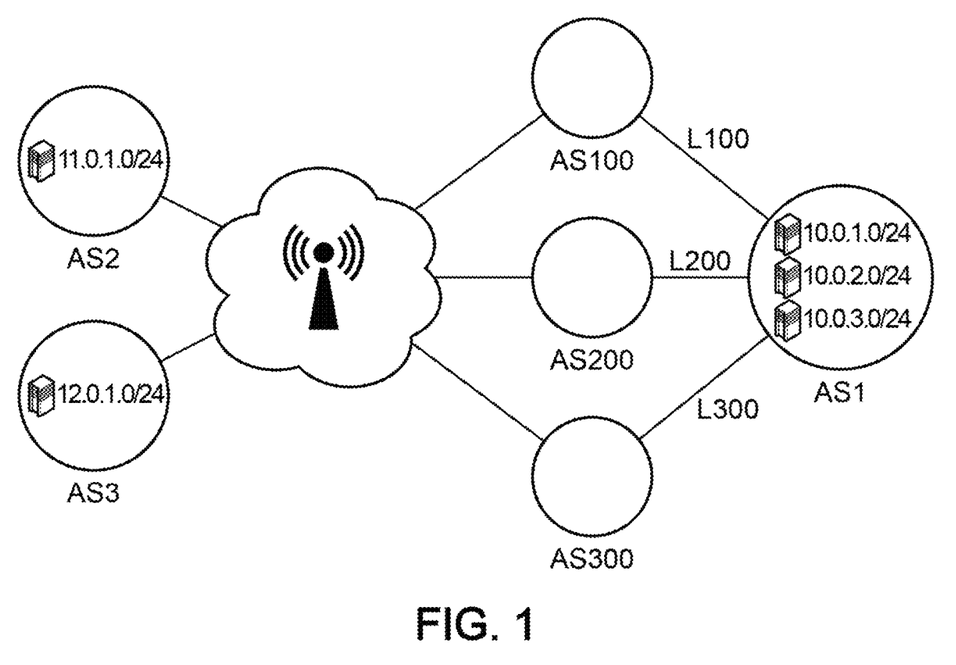
FIG. 1 shows a local autonomous system connected to a plurality of autonomous systems neighboring the local autonomous system in the Internet.

FIG. 1 shows a local autonomous system connected to a plurality of autonomous systems neighboring the local autonomous system in the Internet. The local autonomous system may be configured to implement the method according to the present development, by means of a decision-making device.

The Internet is composed of autonomous systems, sets of networks and routers under a single administrative authority. Different autonomous systems can be interconnected by links for transporting traffic in the form of data packets, and BGP (Border Gateway Protocol) routers implementing a BGP protocol, with the objective of exchanging routing and accessibility information of computer networks under the responsibility of the autonomous systems.

To enable traffic to be sent from one autonomous system to another, each autonomous system may announce prefixes relating to the networks that it hosts, to the neighboring autonomous systems.

The non-limiting case of FIG. 1 shows a local autonomous system AS1 connected to three neighboring autonomous systems AS100, AS200, AS300.

AS100 may be a client autonomous system, AS200 a peer autonomous system and A300 a provider autonomous system.

A client autonomous system may be an autonomous system that obtains data and/or that uses services provided by another autonomous system. A client autonomous system is often an individual or small business.

A provider autonomous system may be an autonomous system that implements an infrastructure to offer services to other autonomous systems and/or to provide data to other autonomous systems. A provider autonomous system may enable a client autonomous system to access the networks under its responsibility. A provider autonomous system may be, for example, an Internet access provider, a technology company, a university or a governmental agency.

Peer autonomous systems may be autonomous systems of the same hierarchic level which conclude agreements relating to a joint implementation or use of structures such as networks or links to route traffic. In a peer type interconnection, two autonomous systems may be mutually authorized to access a subset of networks under their responsibility. Peer autonomous systems may be, for example, Internet access providers.

AS1 may host three networks and announce prefixes 10.0.1.0/24, 10.0.2.0/24, 10.0.3.0/24 relating to these networks, to the neighboring autonomous systems. Each of these three prefixes may be announced on each of the three links connecting AS1 to AS100 (link L100), AS1 to AS200 (link L200), and AS1 to AS300 (link L300).

There are also two autonomous systems AS2 and AS3 connected to systems AS100, AS200 and AS300 via the Internet.

AS2 and AS3 may each announce a prefix. Information relating to the announced prefixes may be transmitted to AS1 through one or more of its direct neighbors AS100, AS200, AS300.

The neighboring autonomous systems AS100, AS200 and AS300 do not announce prefixes.

To influence the routing of traffic on links L100, L200, L300 in its favor, local autonomous system AS1 may implement a method for distributing traffic entering from neighboring autonomous systems A100, A200, A300 on links L100, L200, L300.

FIG. 2 shows a flow chart of a method for distributing traffic across a set of links interconnecting a local autonomous system with a plurality of autonomous systems neighboring the local autonomous system. The method may be implemented by the local autonomous system. The decision-making device may comprise artificial intelligence.

In a first step 101 of the method, the decision-making device may receive one or more pieces of information representative of:—a link load state;—a type of autonomous system for each of the neighboring autonomous systems; and—prefixes relating to networks hosted by the local autonomous system and the autonomous systems, the prefixes being announced by an autonomous system to its neighbors.

The load state may indicate if one or more links are overloaded, reasonably loaded or lightly loaded, as well as the volume of traffic (typically in Gbps).

A type of an autonomous system may describe a hierarchical level of an autonomous system in relation to other autonomous systems. It may be, in particular, a client autonomous system, a peer autonomous system or a provider autonomous system.

The information representative of prefixes relating to hosted networks may comprise details concerning the properties of these networks, such as the number of servers available and the characteristics of the servers, for example the storage or the random access memory.

In particular, information that the local autonomous system receives via other autonomous systems may comprise:—the LOCAL PREF attribute. This attribute may be configured on BGP routers, and gives the routers information about the advantages of taking a certain path. For example, a provider autonomous system having several possible paths for sending traffic may find it advantageous to pass through client autonomous systems, instead of passing through other provider autonomous systems. In general, traffic will prefer the path having the highest LOCAL PREF.—the AS PATH attribute: This attribute may be transported by the traffic and represents the sequence of autonomous systems the traffic has traveled through. In general, traffic will prefer the path in which the AS PATH attribute has the lowest number of autonomous systems, enabling routing loops to be avoided;—any other information, in particular relating to agreements concluded between autonomous systems. Agreements between autonomous systems stipulating the exchanges between the autonomous systems (described by the peering ratio) may exist. These agreements take into account the fact that a connection between autonomous systems is often not symmetrical on the Internet, and that the traffic from a first autonomous system to a second autonomous system will not necessarily take the same path as the traffic from the second autonomous system to the first autonomous system.

In general, traffic will take the shortest path between two autonomous systems and within an autonomous system, which may correspond to the path that optimizes the value of the LOCAL PREF, AS PATH and MED attributes, taking into account constraints such as the agreements concluded between autonomous systems.

In a second step 102, the decision-making device may determine, based on the information received, a result of a reward function, representative of a state of the set of links.

The reward function is an artificial intelligence concept that makes it possible to quantify load balancing on links. For example, a high value of the reward function result may indicate if a load state is desirable. In this regard, the reward function result may be compared to a reference value.

In a third step 103, the decision-making device may trigger, depending on the reward function result and the information received, actions influencing the distribution of traffic across the set of links so as to optimize the load state of the set of links.

The actions may be identified by the artificial intelligence.

For a local autonomous system, the method aims to influence the distribution of traffic coming from one or more neighboring autonomous systems (that often pursue complex strategies for routing traffic) and going to said local autonomous system; i.e., traffic entering said local autonomous system.

For example, if the value of the reward function result is high and greater than a reference value, the artificial intelligence may conclude that the load state is optimal and decide that it is not necessary to trigger optimization actions.

The actions according to the third step 103 may comprise the modification of at least one BGP attribute to which the local system has access, such as: MED, AS PATH, PREFIX. Modification of a BGP attribute represents one means of influencing traffic routing.

The PREFIX attribute represents prefixes announced by a local autonomous system. The PREFIX may be modified by an action known as LOAD SHARING. Modification of the PREFIX by LOAD SHARING consists of announcing only part of the prefixes and/or announcing prefixes to only a subset of the neighboring autonomous systems (potentially only one). The consequence may be that certain links are preferred by the traffic and selected on a priority basis by the neighboring autonomous systems. Potentially, modification of the PREFIX by LOAD SHARING and therefore modification of the manner of announcing prefixes may be the action with the strongest impact on traffic distribution.

Modification of the AS PATH by an action known as PREPENDING enables a local autonomous system to increase the size of the AS PATH attribute artificially, in particular by prepending its own number several times. An autonomous system on the Internet with several paths for a destination prefers the path with the shortest AS PATH.

For example, a local autonomous system may artificially increase the size of a "1 2 3" type of AS PATH attribute, representative of a certain path that the traffic may take, by prepending its own number (e.g. "1 2 2 2 3") several times. If an alternative path that passes through another autonomous system (e.g. "1 4 3") exists, and appears to be shorter because the size of its AS PATH attribute has not been artificially increased, this path will be preferred over the path for which the AS PATH attribute has been increased ("1 2 2 2 3").

The MED (Multi Exit Discriminator) attribute can be exchanged between neighboring autonomous systems and indicates the preferred entry point of the local autonomous system for traffic coming from neighboring autonomous systems and going to the local autonomous system. Modification of the MED attribute makes it possible to influence the entry point of traffic from neighboring autonomous systems into a local autonomous system. Traffic will prefer the path with a low MED value compared to a path with a high MED value. Potentially, modification of the MED attribute may be the third strongest action, after modification of the AS PATH by PREPENDING and modification of the PREFIX by LOAD SHARING.

Modification of a BGP attribute often does not cause an instantaneous modification in traffic distribution. A certain amount of time may be necessary for the corresponding information to propagate and produce its effects.

Taking a prefix propagation delay into account enables artificial intelligence to adapt and optimize the triggered actions.

This delay may be on the order of several seconds to several minutes.

During a step 104, the decision-making device may reiterate the first 101, second 102, and third 103 steps as often as necessary. The objective may be an implementation of the method that enables ongoing monitoring and optimization of the load state of the set of links.

It is often not possible to reach a desired load state by triggering a set of actions once. Reiterating the method enables the artificial intelligence, with each iteration, to learn from prior actions, and to progressively converge towards a desired state. The artificial intelligence can thus learn, in an iterative process, the relationship between the triggered actions and the impact of the actions on the load state, for a given load state.

The desired state may be a predefined state or a state considered to be advantageous by the artificial intelligence.

The reiteration may be carried out at a constant or variable frequency. In one embodiment, the reiteration frequency for an undesired load state may be higher than for a desired load state. If, however, the load state corresponds to an optimal load state, it may be sufficient to monitor the load state less often; i.e., at a lower frequency.

The artificial intelligence may be configured to learn to identify, on the basis of successive reward function results, the actions enabling traffic to be distributed across the set of links so as to optimize the load state across the set of links.

If the reward function result reaches or exceeds a reference value, the artificial intelligence may consider an optimal state to have been reached, although it may be a local extremum of the reward function. The load state may be trapped in a loop and oscillate between two or more suboptimal states.

To remedy such problems, the method may further comprise a step of triggering actions randomly influencing a distribution of traffic across at least part of the set of links. A random distribution of traffic, although such a distribution is not considered useful in principle, may help the artificial intelligence discover the effects of new actions on a given load state.

In one embodiment, the artificial intelligence may comprise a neural network.

Figure 3:
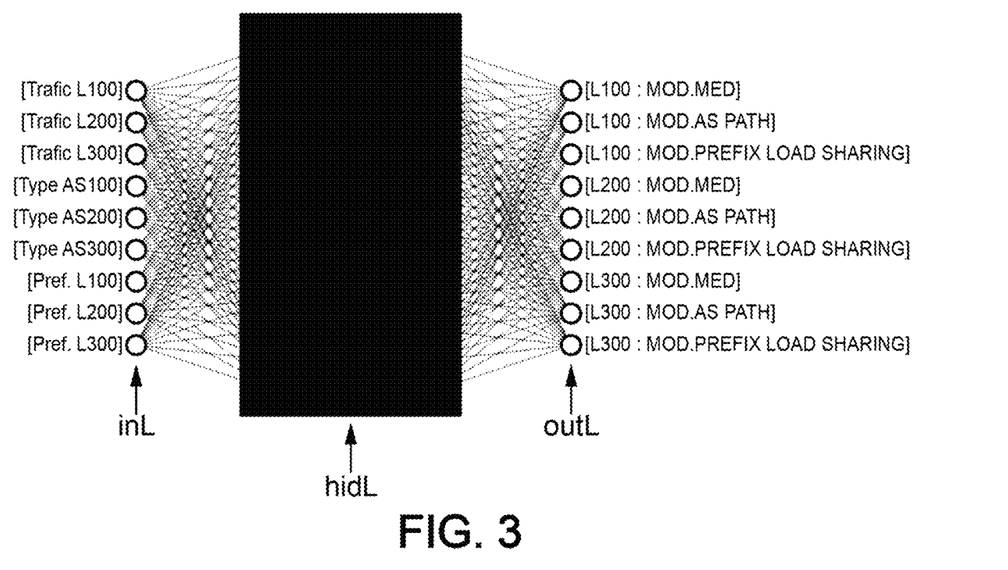
FIG. 3 shows a neural network, configured to identify the actions to be triggered in the implementation of the method for distributing traffic across a set of links.

FIG. 3 describes such a neural network, configured to identify the actions to be triggered in the implementation of the method for distributing traffic across a set of links according to FIG. 2, and for the system according to FIG. 1.

A neural network is specially adapted to implement experiential learning, known as "machine learning," as described above.

In one embodiment, the neural network may be a deep neural network. A deep neural network may comprise millions of neurons, distributed in dozens of layers. They may be used in deep learning to develop learning mechanisms.

The method according to the example embodiment described here relates to unsupervised learning, in which the neural network may be trained, after one or more iterations of the method, and may learn which actions triggered by it optimize the reward function result.

In one particular non-limiting embodiment, the learning may be supervised, and a technician may take action to "indicate" to the neural network certain load states that are considered to be favorable or unfavorable. Such an intervention may be useful, particularly if the triggering of actions randomly influencing a distribution of traffic does not enable a load state to exit from a suboptimal state.

A neural network may comprise an input layer inL, one or more intermediate layers hidL placed one after the other in series, and an output layer outL.

The input layer inL may receive data to be analyzed/processed, and transmit the data received to the first intermediate layer situated downstream from the input layer. The data processed by the first intermediate layer may be transmitted to the second intermediate layer, and so on, until the output layer. Intermediate layers hidL may implement non-linear data transformations.

Each layer of the neural network may comprise a plurality of nodes.

Each of the nodes of the input layer inL may be configured to receive or transmit data in different forms, for example in the form of vectors or matrices.

In the present case, input layer inL may comprise nine nodes, i.e.:—three nodes to receive information relating to the traffic on links L100, L200, L300;—three nodes to receive information representative of the type of neighboring autonomous systems AS100, AS200, AS300.—three nodes to receive information representative of prefixes 10.0.1.0/24, 10.0.2.0/24, 10.0.3.0/24 announced by the local autonomous system AS1 on links L100, L200, L300. A given node may receive information relating to the prefixes announced on a given link.

Output layer outL may be situated downstream from the last intermediate layer and may use as input the results of the last intermediate layer in order to produce the system results.

The results produced by output layer outL may be actions to be triggered that influence a distribution of traffic across the set of links so as to optimize the load state of the set of links.

Output layer outL may comprise a plurality of nodes indicating in what manner the three attributes MED, AS PATH, and PREFIX should be modified. Each node may be configured to indicate a particular action for a given node.

In the present case, output layer outL may comprise nine nodes. Each of the nodes may indicate if the value of the respective attribute (MED, AS PATH, PREFIX) announced on the respective link L100, L200, L300 should be increased, decreased, or remain unchanged.

Learning as described, consisting of learning the actions to be triggered based on experiences with its environment in a manner that optimizes the reward function result over time, is called reinforcement learning.

In one embodiment, reinforcement learning may comprise the "Q-learning" technique. The "Q-learning" technique does not use any model describing the decision-making strategy (enabling a given action to be attributed to a given state). The decision-making strategy is learned by the neural network over time by the exploration of actions (i.e., triggering new actions for a given load state) or the exploitation of actions (i.e., triggering already-known actions).

During neural network iterative learning, the relationship between the initial load state of the set of links (i.e., before triggering an action), the reward function result, and the triggered action that acts on the initial load state, may be recorded and stored by the neural network. When a certain action triggered in response to a given initial load state improves or does not improve the reward function result, this relationship may be recorded by the neural network. A reference database may thus be created and improved over time. In this manner, the neural network will "know" which action(s) must be triggered or not triggered when a given load state appears.

No prior knowledge of the system state is required. The neural network may be configured to discover progressively, on the basis of the reward function result, for example by comparing the reward function result to a reference value, the actions that lead to optimization of traffic and of the link load state.

Learning enables the neural network to be trained and to learn, after one or more iterations of the method, the effects of previously triggered actions on the load state of the set of links. The neural network may then chose actions, according to similar precedents, so as to optimize the load state of the links represented by the reward function result. Therefore, actions that the neural network considers to be advantageous may vary during each iteration.

In the conventional case of a neural network (with updating of weighting coefficients affecting links between nodes, for example at each iteration), it may be planned to update these weighting coefficients according to the reward function result obtained, based on observations at a given time. Typically these coefficients may be updated every time a new reward function result is obtained. The updating of weighting coefficients may be carried out by the gradient backpropagation technique. This technique enables the neural network to be trained by using the gradient of the weighting coefficients relative to an error function. This error function may be the result of differences between results produced by the neural network and the desired results. The "Q-learning" technique enables the desired results to be calculated according to the reward function result.

In one variant, the neural network may not start at "zero," i.e., without prior knowledge, but is based on prior knowledge relating to the properties of the system or the effects of actions triggered earlier.

It is possible to play with the different network architecture parameters: the number of layers, the type of each layer, the number of neurons that compose each layer. The higher the number of layers, the more the neural networks are likely to learn complex phenomena.

Implementation of the method according to the present development is illustrated by using a numerical example, for the case of the system shown in FIG. 1.

A local autonomous system AS1 may be connected to three neighboring autonomous systems ASi, with i=100, 200, 300. AS100 may be a client system, AS200 a peer system and A300 a provider system.

AS1 may announce three prefixes $Pa_{AS1-ASi,j}$ relating to the networks that it hosts: $Pa_{AS1-ASi,1}$=10.0.1.0/24, $Pa_{AS1-ASi,2}$=10.0.2.0/24, and $Pa_{AS1-ASi,3}$=10.0.3.0/24. Each of these three prefixes may be announced on each of the three links Li connecting AS1 to AS100 (link L100), AS1 to AS200 (link L200), and AS1 to AS300 (link L300).

There are also two autonomous systems AS2 and AS3 connected to systems AS100, AS200 and AS300 via the Internet.

AS2 and AS3 may each announce a prefix $Pr_k$ (k=2, 3; $Pr_2$ being the prefix announced by AS2, and $Pr_3$ being the prefix announced by AS3): $Pr_2$=11.0.1.0/24 and $Pr_3$=12.0.1.0/24. Information relating to the announced prefixes may be transmitted to AS1 through one or more of its direct neighbors (AS100, AS200, AS300).

The neighboring autonomous systems AS100, AS200 and AS300 do not announce prefixes.

Information received by AS1 may comprise: $-Pa_{AS1-ASi,j}$: all the prefixes announced by AS1 on link $L_i$; $-Pr_k$: all the prefixes received by AS1, corresponding to the prefixes announced by AS2 and AS3; $-locpref_k$: the LOCAL PREF attribute for the prefixes $Pr_k$ received by AS1.

In addition, AS1 may receive information representative of a load state of links interconnecting AS1 with its neighbors AS100, AS200 and AS300. This information may comprise information about: $T_{AS1-ASi,j}$: traffic entering into AS1 for the prefixes $Pa_{AS1-ASi,j}$ announced on link Li.

In addition, information received by AS1 may be representative of a type of autonomous system for each of the neighboring autonomous systems. The information may indicate that AS100 is a client system, AS200 a peer system and A300 a provider system.

The information received may comprise information about the AS PATH attribute and about the MED attribute for each of the prefixes $Pa_{AS1-ASi,j}$ announced by AS1.

In addition, the information received may comprise the capacity $C_{AS1-ASi}$ of links L100, L200 and L300.

Artificial intelligence may determine, from the information received, the reward function result. The reward function $f_{reward}$ may be calculated as the sum of a score relating to the preferences of the neighboring autonomous systems (score$_{pref}$) and of a score relating to the traffic received by AS1 (score$_{traf}$): f$_{reward}$=score$_{pref}$+score$_{traf}$.

score$_{pref}$ may be calculated as follows:

$$score_{pref} = \sum_{k} LP_k * \text{agreement};$$

$$LP_k = \frac{locpref_k - \min(LOCALPREF)}{\max(LOCALPREF) - \min(LOCALPREF)}; k = 2, 3;$$

LP$_2$ and locpref$_2$ being variables describing AS2, and LP$_3$ and locpref$_3$ being variables describing AS3; and agreement=1 for the provider; agreement=2 for the peer; agreement=3 for the client.

The "agreement" variable indicates the preferences of local autonomous system AS1. For example, if AS1 is a provider autonomous system such as a mobile operator, it may be preferable that links from client autonomous system AS100 are used to route traffic, rather than links from provider autonomous system AS300. The "agreement" variable therefore has a higher value for a client than for a provider.

LOCALPREF may be a matrix comprising the LOCAL PREF attribute for each of the prefixes received by AS1.

score$_{traf}$ may be calculated as follows: score$_{traf}$=Σ$_i$C$_i$/T$_i$ with C$_i$=C$_{AS1\text{-}ASi}$ and T$_i$=Σ$_j$ T$_{As1\text{-}Asi,j}$.

Information received by AS1 may be in the form of the following matrix, for each of links L100, L200 and L300: [Li, <C$_{AS1\text{-}Asi}$>, [<Pa$_{AS1\text{-}ASi,j}$>, <T$_{AS1\text{-}ASi,j}$>], [<Pr$_k$>, <locpref$_k$>]]

Hereafter, a numerical example will be considered.

For link L100, the information received may be the following: [L100, 10 Gbps, [[10.0.1.0/24, 11 Gbps], [10.0.2.0/24, 0 Gbps], [10.0.3.0/24, 0 Gbps]], [[11.0.1.0/24, 100], [12.0.1.0/24, 100]]].

For prefix 10.0.1.0/24, traffic enters local autonomous system AS1 via link L100.

For link L200, the information received may be the following: [L200, 5 Gbps, [[10.0.1.0/24, 0 Gbps], [10.0.2.0/24, 7 Gbps], [10.0.3.0/24, 0 Gbps]], [[11.0.1.0/24, 100], [12.0.1.0/24, 100]]].

For prefix 10.0.2.0/24, traffic enters local autonomous system AS1 via link L200.

For link L300, the information received may be the following: [L300, 20 Gbps, [[10.0.1.0/24, 0 Gbps], [10.0.2.0/24, 0 Gbps], [10.0.3.0/24, 6 Gbps]], [[11.0.1.0/24, 100], [12.0.1.0/24, 300]]].

For prefix 10.0.3.0/24, traffic enters local autonomous system AS1 via link L300.

The value of the MED attribute may be equal to 500 for all three prefixes announced by AS1 on each of the three links L100, L200 and L300.

The reward function result is therefore: f$_{reward}$=score$_{pref}$+score$_{tra}$=2+4. 95=6.95.

Artificial intelligence may analyze the reward function result, for example by comparing it to a reference value, and attempt to improve it thereafter.

The reward function result thus calculated enables the artificial intelligence, alone or in combination with certain matrix values received for each of links L100, L200 and L300, to identify actions to be triggered influencing traffic on the links.

In this regard, BGP attributes (MED, AS PATH, PREFIX) may be modified, in particular may be increased or decreased, on one or more links Li.

In the matrix received for first link L100, one can see there is traffic congestion for prefix 10.0.1.0/24 (capacity C$_{AS1\text{-}AS100}$ of link L100 is 10 Gbps, but the traffic entering T$_{AS1\text{-}AS1,1}$ is 11 Gbps).

To improve this suboptimal load state, the MED attribute of prefix 10.0.1.0/24 may be modified for link L300: L100: MED unchanged; L200: MED unchanged; L300: MED 500->400.

As traffic will prefer a link with a low MED value, this action has the potential to increase traffic on link L300 and therefore resolve the traffic congestion problem on link L100.

In the matrix received for second link L200, one can see there is traffic congestion for prefix 10.0.2.0/24 (capacity C$_{AS1\text{-}AS200}$ of link L200 is 5 Gbps, but the traffic entering T$_{AS1\text{-}AS2,2}$ is 7 Gbps).

To improve this suboptimal load state, the MED attribute of prefix 10.0.2.0/24 may be modified for link L100: L100: MED 500->400; L200: MED unchanged; L300: MED unchanged.

As traffic will prefer a link with a low MED value, this action has the potential to increase traffic on link L100 and therefore resolve the traffic congestion problem on link L200.

In addition, to improve the state relating to traffic congestion on link L200, the AS PATH attribute may be modified for prefix 10.0.2.0/24 on link L200: L100: AS PATH unchanged; L200: AS PATH i->1 1 1 1 i; L300: AS PATH unchanged.

This modification has the potential, in addition to the action already carried out (L100: MED 500->400), to resolve the traffic congestion problem on link L200.

If the load state is still unsatisfactory, other actions may be triggered.

Reiteration of the method may occur after each triggered action. In each iteration, a new piece of information representative of the load state of the links may be received, and a new reward function result may be determined.

Alternatively, several actions may be triggered consecutively before reiterating the method.

Figure 4:
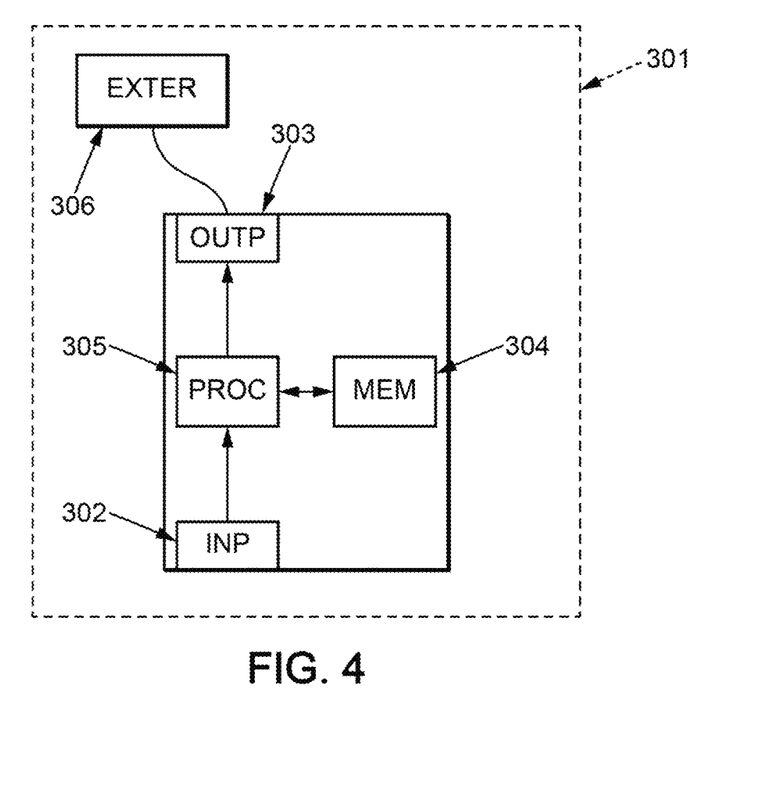
FIG. 4 presents a device adapted to implement the method.

FIG. 4 shows a decision-making device 301 for distributing traffic across a set of links interconnecting a local autonomous system with a plurality of autonomous systems neighboring the local autonomous system.

The device may be implemented by the local autonomous system.

In one embodiment, the device may be integrated into the local autonomous system and may be configured to distribute traffic across a set of links interconnecting the local autonomous system with neighboring autonomous systems.

Decision-making device 301 is adapted to implement the method described by FIG. 2.

In this embodiment, decision-making device 301 comprises at least one input interface 302 for the reception of messages or instructions, and at least one output interface 303 for communication with external devices 306 such as one or more neighboring autonomous systems or BGP routers interconnecting autonomous systems.

The at least one input interface 302 may be configured for: /a/ receiving information representative of:—a load state of the set of links;—a type of autonomous system for each of the neighboring autonomous systems; and—prefixes relating to networks hosted by the local autonomous system and the neighboring autonomous systems, the prefixes being announced by an autonomous system to its neighbors.

Decision-making device 301 also comprises a memory 304 for storing instructions enabling the implementation of at least part of the method, the data received, and temporary data for carrying out the various steps 104, 102, 103 and 104 and operations of the method as described previously.

Decision-making device 301 also comprises a processing circuit 305. This circuit may be, for example:—a processor able to interpret instructions in the form of a computer program, or—a circuit board wherein steps 101, 102, 103 and 104 and operations of the method of the disclosure may be defined in silicon, or else—a programmable electronic chip such as an FPGA for"Field-Programmable Gate Array," such as an SOC for "System On Chip" or such as an ASIC for "Application Specific Integrated Circuit."

SOCs or systems on chip are embedded systems that integrate all components of an electronic system in a single chip. ASIC is a dedicated electronic circuit that brings together custom features for a given application. ASICs are generally configured during their production and can only be simulated by an operator of decision-making device 301. FPGA-type programmable logic circuits are electronic circuits that are reconfigurable by the operator of decision-making device 301.

The processing circuit 305 may be configured for: /b/ determining, from the information received, a result of a reward function, representative of a state of said set of links; /c/ triggering, based on the information received and the result of the reward function, at least one action influencing a distribution of traffic across the set of links so as to optimize the load state of the set of links; and /d/ reiterating steps /a/ to /c/.

The local autonomous system may comprise an artificial intelligence configured to learn to identify, on the basis of successive reward function results, the actions enabling traffic to be distributed across the set of links so as to optimize the load state of the set of links.

Depending on the embodiment, decision-making device 301 may be a computer, a computer network, an electronic component, or another device comprising a processor operatively coupled to a memory, as well as, depending on the embodiment chosen, a data storage unit, and other associated hardware elements such as a network interface and a media player for reading a removable storage medium and writing on such a medium, not shown in FIG. 4. The removable storage medium may be, for example, a compact disc CD, a digital versatile disc DVD, a flash disc, a USB key, etc.

Depending on the embodiment, the memory 304, the data storage unit or the removable storage medium contains instructions that, when executed by processing circuit 305, cause this circuit to carry out or control the at least one input interface 302, the at least one output interface 303, the data storage in memory 304 and/or the processing of data and/or the implementation of at least part of the method according to FIG. 2.

The processing circuit 305 may be a component implementing the driving of decision-making device 301.

In addition, decision-making device 301 may be implemented in software form, in which case it takes the form of a program executable by a processor, or in hardware form, such as an application specific integrated circuit ASIC, a system on chip SOC, or in the form of a combination of hardware and software elements, for example a software program intended to be loaded and executed on an electronic component described above, such as an FPGA or processor.

Decision-making device 301 may also use hybrid architectures, for example architectures based on a CPU+FPGA, a GPU for "Graphics Processing Unit" or an MPPA for "Multi-Purpose Processor Array."

Decision-making device 301 may monitor networks hosted by the local autonomous system.

The present disclosure allows distributing traffic across a set of links interconnecting a local autonomous system with a plurality of autonomous systems neighboring the local autonomous system.

The present disclosure is not limited to the examples of devices, systems, methods, uses and computer program products described above, only by way of example, but encompasses all the variants that may be envisaged by the person skilled in the art within the scope of the protection sought.

The invention claimed is:

1. A method for distributing traffic across a set of links interconnecting a local autonomous system with a plurality of autonomous systems neighboring the local autonomous system, the method comprising:
   /a/ receiving information at least relating to characteristics of the plurality of neighboring autonomous systems;
   /b/ determining, from the information received, a result of a reward function, representative of a state of the set of links;
   /c/ triggering, based on the information received and the result of the reward function, at least one action influencing a distribution of traffic across the set of links so as to optimize the load state of the set of links;
   /d/ reiterating steps /a/ to /c/;
   the at least one action being identified by an artificial intelligence configured to learn to identify, on the basis of successive results of the reward function, actions enabling traffic to be distributed across the set of links so as to optimize the load state of the set of links,
wherein the information received according to step /a/ is representative of:
   a load state of the set of links;
   a type of autonomous system for each of the neighboring autonomous systems; and
   prefixes relating to networks hosted by the local autonomous system and the neighboring autonomous systems, the prefixes being announced by an autonomous system to its neighbors,
   wherein the at least one action triggered according to step /c/ comprises the modification of the at least one Border Gateway Protocol (BGP) attribute, and
   wherein the modification of the at least one BGP attribute takes into consideration a propagation delay of the prefixes to be announced.

2. The method according to claim 1, wherein the artificial intelligence comprises a neural network.

3. The method according to claim 1, wherein optimization of the load state according to step /c/ comprises the convergence of the load state towards a desired load state.

4. The method according to claim 1, wherein the type of autonomous system is a client autonomous system, a peer autonomous system or a provider autonomous system.

5. The method according to claim 1, wherein the modification of the at least one BGP attribute comprises the modification of at least one BGP attribute among: multi exit discriminator (MED), autonomous system (AS) PATH, PREFIX.

6. The method according to claim 1, wherein the method comprises a step of triggering at least one action randomly influencing a distribution of traffic across at least part of the set of links.

7. A decision-making device for distributing traffic across a set of links interconnecting a local autonomous system with a plurality of autonomous systems neighboring the local autonomous system, the device comprising:
- at least one interface configured to:
  - /a/ receive information at least relating to characteristics of the plurality of neighboring autonomous systems;
- at least one processing circuit configured to:
  - /b/ determine, from the information received, a result of a reward function, representative of a state of the set of links;
  - /c/ trigger, based on the information received and the result of the reward function, at least one action influencing a distribution of traffic across the set of links so as to optimize the load state of the set of links; and
  - /d/ reiterate steps /a/ to /c/;
- the device comprising an artificial intelligence configured to learn to identify, on the basis of successive results of the reward function, the at least one action enabling traffic to be distributed across the set of links so as to optimize the load state of the set of links, wherein the information received according to /a/ is representative of:
- a load state of the set of links;
- a type of autonomous system for each of the neighboring autononmous systems; and
- wherein the at least one action triggered according to /c/ comprises the modification of at least one Border Gateway Protocol (BGP) attribute, and
- wherein the modification of the at least one BGP attribute takes into consideration a propagation delay of the prefixes to be announced.

8. A processing circuit comprising a processor and a memory, the memory storing program code instructions of a computer program which, when these instructions are executed by the processor, implement the method according to claim 1.

* * * * *